June 11, 1968     C. G. F. RICHARDS     3,387,815
SEAT FOR BALL-VALVE AND BALL-VALVE USING THIS SEAT
Filed Sept. 23, 1965

United States Patent Office 3,387,815
Patented June 11, 1968

3,387,815
SEAT FOR BALL-VALVE AND BALL-VALVE
USING THIS SEAT
Cecil Graham Francis Richards, Brisbane, Queensland,
Australia, assignor to B. C. Richards & Co. Pty. Ltd.,
Brisbane, Queensland, Australia
Filed Sept. 23, 1965, Ser. No. 489,544
Claims priority, application Australia, May 21, 1965,
59,179/65
4 Claims. (Cl. 251—174)

ABSTRACT OF THE DISCLOSURE

To enable a slow-recovery deformable sealing ring for a ball valve to retain sealing contact with the ball and peripherally with the casing on slight movements of the ball under fluid pressure, a sealing assembly includes said sealing ring, its rear face undercut in tapered form, a rigid backing ring with forward face fitting said undercut face, and a spring bearing on the rear face of the backing ring and urging the backing and sealing rings towards the ball.

---

This invention relates to ball-valves either for liquids or gases and to seats therefor.

Ball-valves consist essentially of an axially apertured ball rotatable about a diametral axis at right angles to its aperture. The aperture in open position is aligned with inlet and outlet fluid-flow apertures in the ball casing, and the un-apertured ball surfaces close said fluid-flow apertures in valve-closed position. It is necessary to have a circular ring seat around inlet and outlet apertures closely contacting the ball surface to ensure no leakage into the body of the valve at any time and no leakage into the ball aperture in valve-closed position. Such a valve will be described as "a ball-valve of the type specified."

Tough, hardwearing plastic materials such as p.t.f.e. (poly-tetrafluor-ethylene) have been used to make these seats and are well recognized as having considerable advantages.

Such materials have however, two disadvantages. They are vary expensive and, owing to their lack of resilience, are slow to recover their shape after deformation. It is therefore desirable to use as small a quantity of plastic material as will give adequate sealing and to compensate for the slow recovery properties.

The seat assembly of this invention may accomplish both these desirable features in a simple manner. The invention may also be used with advantage with resilient seats such as buna rubber, as will appear below.

Accordingly, the invention comprises a ball-valve seat assembly including a sealing ring, its forward face shaped to seal against the ball and its rear face being undercut in tapered form, a backing ring of hard material with its forward face tapered to fit within the taper of the sealing ring and its rear face substantially planar, and spring or resilient means urging the sealing ring against said ball against said backing ring. The whole assembly is preferably mounted in an annular rebate machined around the edge of the inlet or outlet aperture, the spring or resilient means being between the radial face of the rebate remote from the sealing ring and the rear face of the backing ring. The spring may conveniently be a distorted ring of spring steel, which may be corrugated or twisted circumferentially.

The invention also comprises a ball valve having a seat as described above.

Exemplary embodiments of the invention will now be described with reference to the drawings, in which.

Figure 1:
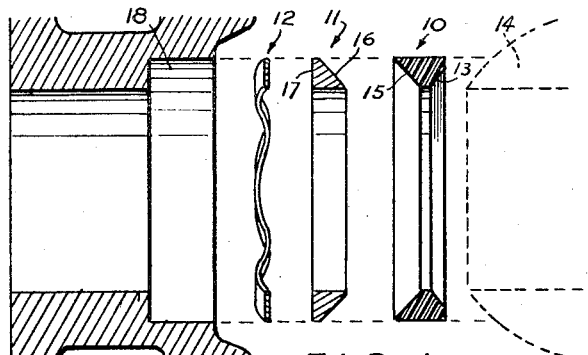
FIG. 1 shows in section an exploded view of one embodiment of the seal of the invention.

FIG. 1 shows a p.t.f.e. sealing ring 10, a stainless steel backing ring 11 and a corrugated or twisted spring-steel spring 12. These elements are shown separated in FIG. 1 for clarity. The sealing ring 10 has a sealing face 13 shaped to fit against the ball 14 (shown dotted in FIG. 1) and its rear face 15 is undercut to taper outwards away from face 13.

The backing ring 11 has a forward face 16 tapering inwards towards ring 10, and a radial rear face 17. The forward face 16 of ring 11 and the rear face 15 of ring 10 have similar tapers, so that these faces make surface contact in operative position.

Figure 2:
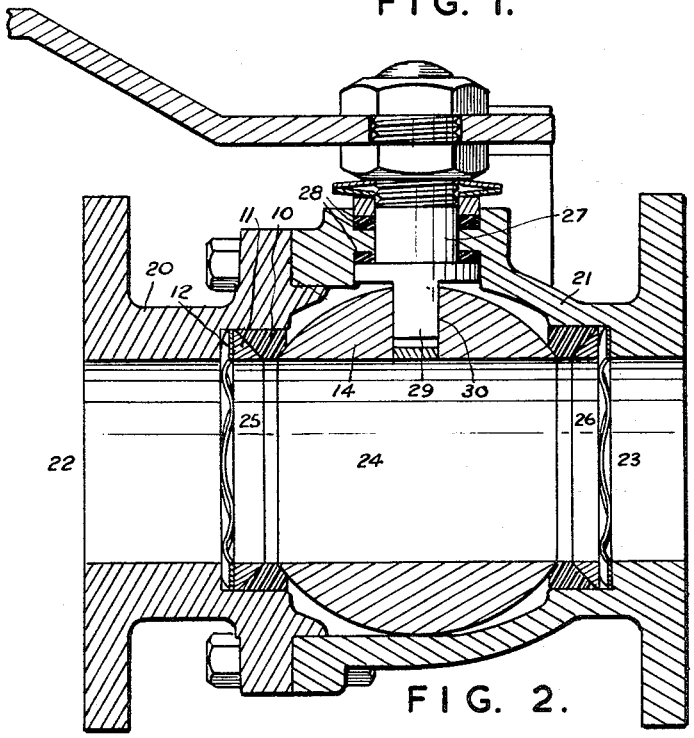
FIG. 2 shows diagrammatically and in section a ball valve using the seal of FIG. 1.

Under axial pressure spring 12 tends to flatten out and in operation exerts spring pressure on the rear face 17 of ring 11. Spring 12 and rings 11 and 10 are inserted in that order in an annular rebate 18 in an inlet or outlet aperture of the valve, as shown in FIG. 2. The casing of the valve shown in FIG. 2 is in two parts 20, 21 which together surround the ball 14. An inlet aperture 22 and an outlet aperture 23 are provided, these being in line with each other and with an aperture 24 in ball 14 in "valve-open" position (as shown). Seal assemblies 25 and 26 as described with reference to FIG. 1 are provided at inlet and outlet respectively.

To operate the valve, the ball 14 is turned about a vertical axis by a shaft 27 rotatably mounted through the casing and having suitable pressure seals 28 thereon. Shaft 27 is connected to ball 14 via a flattened lower projection 29 on shaft 27 engaged in a slot 30 in ball 14. In use, the sealing ring 10 contacts the surface of ball 14, aided by its own deformation and pressure from spring 12 through backing ring 11.

Owing to the taper on backing ring 11, the sealing ring 10 is also urged radially outwards by spring pressure and forced against the periphery of the rebate 18, thus preventing leakage around the outside of the sealing ring 10. If the valve is closed, pressure on the upstream side moves the ball bodily a slight distance. In the absence of spring 12 and tapered backing ring 11, the upsteam sealing ring 10 in assembly 25 would not immediately expand to take up this movement, and leakage would occur. However, spring 12 urges sealing ring 10 bodily along rebate 18 to maintain contact with ball 14, and tapered backing ring 11 again ensures no leakage round the outside of sealing ring 10. Similarly, when the valve is opened, the downstream seal 26 follows the reverse movement of the ball 14.

The seating described thus ensures efficient sealing at all times, and also automatically takes up any wear on the seating surfaces. Since movement of the ball 14 may occur without detriment to the sealing, it is of advantage to allow such small movements of ball 14 to occur, since the pressures on the ball from assemblies 25 and 26 are then automatically equalized in spite of uneven wear. This is the purpose of the non-rigid coupling between ball 14 and shaft 27 formed by projection 29 and slot 30. This arrangement allows ball 14 to move axially as a whole in "valve-closed" position and also to rotate slightly about a horizontal axis through its centre in either position, thus equalizing pressure from assemblies 25 and 26 and also pressure around each assembly.

Prior p.t.f.e. and similar sealing rings, not having the arrangement of spring and backing ring described, had to be of considerable cross-section in an attempt to provide enough resilience to keep a reasonable seal.

The ring 10 of the arrangement described may be of much smaller cross-section, with consequent saving of expensive material. Owing to the small section of ring 10, a more effective fire seal is available, since small clearance between the casing and ball 14 remains if ring 10 burnt out.

Figure 3:
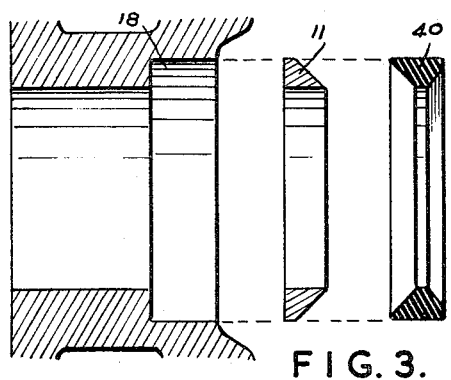
FIG. 3 shows a modified form of seal in exploded sectional view.

FIG. 3 is an exploded view similar to FIG. 1 but employing a sealing ring 40 of resilient material such as rubber. The spring 12 of FIG. 1 is omitted, its function being carried out by the resilience of ring 40. However, backing ring 11 and ring 40 are tapered in the same way as rings 10 and 11 in FIG. 1. Resilient pressure from ring 40 forces that ring against the ball and the rear face 17 of backing ring 11 against the radial face of rebate 18. The tapered face 16 of ring 11 is therefore forced axially against the rear tapered face 41 of ring 40, and exerts a radial force on ring 40 sealing it tightly against the periphery of rebate 18 and preventing leakage around the outside of ring 40.

The seal of FIG. 3 may obviously be used in a valve as shown in FIG. 2. It will be appreciated that the arrangements described may be changed or modified without departing from the invention claimed. For example the spring 12 of FIGS. 1 and 2 may be replaced by other configurations such as a corrugated spring-steel ring or a ring of resilient plastic or rubber. Owing to the automatic take-up by the spring 12 of FIGS. 1 or 2, sealing ring 10 in some circumstances may be of metal or other hard material instead of plastic material, the "wedging" peripheral seal being still attainable by tappered engagement of backing ring 11 and sealing ring 10.

What I claim is:

1. In a ball valve of the type specified; a sealing assembly including a sealing ring of deformable material having slow recovery properties after deformation, its forward face shaped to seal against the ball, its rear face being undercut in tapered form and its outer face cylindrical; a backing ring of hard material with its forward face tapered to fit within the taper of said rear face of said sealing ring, its outer face cylindrical and of the same diameter as said outer face of said sealing ring; and spring means bearing on the rear face of said backing ring and urging said backing ring and said sealing ring towards said ball; and a mounting for said ball allowing limited movement between said ball and the casing of the valve in response to fluid pressure.

2. Apparatus as claimed in claim 1, in which said spring means lies between said rear face of said backing ring and a radial surface of a rebate around a fluid flow aperture of said valve.

3. A ball valve of the type specified having a sealing assembly around the inlet aperture of said valve; a similar sealing assembly around the outlet aperature of said valve; and a mounting for the ball allowing limited movement between the ball and the casing of the valve in response to fluid pressure; in which each said assembly includes a sealing ring of deformable material having slow recovery properties after deformation its forward shaped to seal against the ball, its rear face being undercut in tapered form and its outer face cylindrical; a backing ring of hard material with its forward face tapered to fit within the taper of said rear face of said sealing ring, its outer face cylindrical and of the same diameter as said outer face of said sealing ring; and spring means bearing on the rear face of said backing ring and urging said backing ring and said sealing ring towards said ball.

4. A ball valve as claimed in claim 3, in which said mounting for said ball includes a rotatable shaft passing through the casing of the valve and a coupling between said shaft and a said ball allowing limited relative motion therebetween.

References Cited

UNITED STATES PATENTS

| 2,533,931 | 12/1950 | Hartley | 251—174 |
| 2,548,128 | 4/1951 | Snyder | 251—174 |
| 3,269,694 | 8/1966 | Hardison | 251—174 |

FOREIGN PATENTS

| 891,372 | 3/1962 | Great Britain. |

CLARENCE R. GORDON, *Primary Examiner.*